(12) United States Patent
Horng

(10) Patent No.: US 8,692,430 B2
(45) Date of Patent: Apr. 8, 2014

(54) MOTOR AND MOTOR ASSEMBLING METHOD

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 154 days.

(21) Appl. No.: 13/117,275

(22) Filed: May 27, 2011

(65) Prior Publication Data
US 2012/0194010 A1 Aug. 2, 2012

Related U.S. Application Data

(63) Continuation-in-part of application No. 13/052,423, filed on Mar. 21, 2011, now abandoned.

(30) Foreign Application Priority Data

Feb. 1, 2011 (TW) ................................. 100103819
Apr. 6, 2011 (TW) ................................. 100111792

(51) Int. Cl.
*H02K 5/16* (2006.01)
*H02K 7/08* (2006.01)

(52) U.S. Cl.
USPC .............................................. 310/90; 310/43

(58) Field of Classification Search
USPC ..................................................... 310/90, 43
See application file for complete search history.

(56) References Cited

U.S. PATENT DOCUMENTS

| | | | |
|---|---|---|---|
| 6,654,213 B2 | 11/2003 | Horng et al. | |
| 6,700,262 B2 * | 3/2004 | Osawa et al. | .................. 310/91 |
| 2002/0047329 A1 | 4/2002 | Sashino et al. | .................. 310/43 |
| 2002/0047397 A1 * | 4/2002 | Osawa et al. | .................... 310/90 |
| 2005/0046286 A1 | 3/2005 | Horng et al. | ............... 310/67 R |
| 2005/0052089 A1 | 3/2005 | Horng et al. | .................... 310/90 |
| 2005/0275299 A1 | 12/2005 | Horng et al. | .................. 310/90.5 |
| 2007/0284957 A1 | 12/2007 | Horng et al. | .................... 310/90 |
| 2008/0056627 A1 | 3/2008 | Horng et al. | |
| 2009/0046960 A1 | 2/2009 | Hibi et al. | ..................... 384/107 |
| 2009/0175744 A1 * | 7/2009 | Alex et al. | .................. 417/423.7 |
| 2009/0256441 A1 | 10/2009 | Horng et al. | .................... 310/90 |
| 2009/0261672 A1 | 10/2009 | Horng et al. | |
| 2009/0285699 A1 | 11/2009 | Muraoka et al. | ............. 417/354 |
| 2009/0309438 A1 | 12/2009 | Horng et al. | |
| 2010/0028177 A1 * | 2/2010 | Horng et al. | ............... 417/423.7 |
| 2010/0127588 A1 | 5/2010 | Horng | |
| 2010/0232993 A1 | 9/2010 | Yabuuchi et al. | .......... 417/423.7 |

FOREIGN PATENT DOCUMENTS

TW 1287962 10/2007
TW 201041279 A1 11/2010

* cited by examiner

*Primary Examiner* — Tran Nguyen
*Assistant Examiner* — Alex W Mok
(74) *Attorney, Agent, or Firm* — Alan Kamrath; Kamrath IP Lawfirm, P.A.

(57) ABSTRACT

A motor assembling method provides a base with a shaft tube. The shaft tube has a thermoplastic positioning portion on an opening end thereof, and a shaft tube assembly is disposed into the shaft tube via the opening end. The motor assembling method further heats the thermoplastic positioning portion by a heating fixture to melt and deform the thermoplastic positioning portion until the opening end of the shaft tube has shrunk. The shaft tube assembly is held in position in the shaft tube after the thermoplastic positioning portion has cooled down and solidified. The motor assembling method further couples a stator unit with an outer circumferential wall of the shaft tube, and couples a rotor with the shaft tube.

23 Claims, 13 Drawing Sheets

MOTOR AND MOTOR ASSEMBLING METHOD

This is a continuation-in-part application of U.S. patent application Ser. No. 13/052,423 filed on Mar. 21, 2011, now abandoned.

BACKGROUND OF THE INVENTION

1. Field of the Invention

The present invention generally relates to a motor and a motor assembling method and, more particularly, to a motor and a motor assembling method that can securely hold components received in the motor's shaft tube in position.

2. Description of the Related Art

Referring to FIG. 1, a cooling fan is disclosed by Taiwanese Patent No. 1287962. During assembly of the cooling fan 8, four standing bars 811 of a shaft sleeve 81 that are flexible and radially arranged are bent outwards to receive a bearing 82. After the bearing 82 is received in a compartment defined by the four standing bars 811, the four standing bars 811 are released to fix the bearing 82 in the compartment. Accordingly, subsequent assembly procedures can be performed.

In the conventional motor assembling method above, the four standing bars 811 may not be able to clip the bearing 82 in a stable way even though they encase the bearing 82. In light of this, additional components are required to better fix the bearing 82. In addition, a gap is presented between each two adjacent standing bars 811 and that gap may result in a weak structural strength of the shaft sleeve 81, which shortens the service life of the cooling fan 8. More importantly, the cooling fan 8 has an inconvenient assembly as it is required to bend the four standing bars 811 outwards when receiving the bearing 82.

Referring to FIG. 2, a stator of a conventional motor 9 is disclosed by Taiwanese Patent Publication No. 201041279 entitled "The Motor Stator". During assembly of the conventional motor 9, it is required to dispose a bearing 91 and a supporting member 92 in a shaft tube 93 first (components that are intended to be received in the shaft tube 93 are called "shaft tube assembly" hereinafter, such as the bearing 91 and the supporting member 92 in this case). Then, a stator 94 is fitted around the shaft tube 93. Finally, a position fixing member 941 can be provided to abut against the shaft tube assembly. Based on this, subsequent assembly procedures can be performed.

However, the position fixing member 941 of the stator 94 requires independent manufacture, which increases the structural complexity and costs of the stator 94. Furthermore, since it is somewhat difficult for one to control the force applied for assembling the conventional motor 9, the position fixing member 941 of the stator 94 may cleave or snap off easily when the position fixing member 941 does not press the shaft tube assembly with a proper force. This not only causes inconvenience in assembly but also affects the positioning efficiency of the shaft tube assembly.

In light of this, it is desired to improve the positioning structure of the shaft tube assembly.

SUMMARY OF THE INVENTION

It is therefore the primary objective of this invention to provide a motor assembling method which uses a shaft tube of a motor to hold a shaft tube assembly received in the shaft tube in position, thereby simplifying the assembly procedures of the motor.

It is another objective of this invention to provide a motor assembling method which prevents a shaft tube assembly received in a shaft tube from being excessively pressed by the shaft tube.

It is yet another objective of this invention to provide a motor assembling method which can efficiently hold a shaft tube assembly received in a shaft tube in position without using additional components, thereby preventing other components from being damaged during assembly procedures.

It is yet another objective of this invention to provide a motor which uses a shaft tube to hold a shaft tube assembly received in the shaft tube in position, thereby preventing the shaft tube assembly from disengaging from the shaft tube.

It is yet another objective of this invention to provide a motor which provides a simplified structure for holding a shaft tube assembly received in a shaft tube of the motor in position, thereby efficiently reducing the manufacturing costs and structural complexity of the motor.

It is yet another objective of this invention to provide a motor assembling method and a motor utilizing the same, in which the motor forms a simple structure that firmly presses both the shaft tube assembly and the stator unit of the motor.

The invention discloses a motor assembling method. The motor assembling method provides a base with a shaft tube. The shaft tube has a thermoplastic positioning portion on an opening end thereof, and a shaft tube assembly is disposed into the shaft tube via the opening end. The motor assembling method further heats the thermoplastic positioning portion by a heating fixture to melt and deform the thermoplastic positioning portion until the opening end of the shaft tube has shrunk. The shaft tube assembly is held in position in the shaft tube after the thermoplastic positioning portion has cooled down and solidified. The motor assembling method further couples a stator unit with an outer circumferential wall of the shaft tube, and couples a rotor with the shaft tube.

Furthermore, the invention discloses a motor. The motor includes a base having a shaft tube receiving a shaft tube assembly. The shaft tube assembly has a maximal outer diameter. The shaft tube has a thermoplastic positioning portion, and the opening end of the shaft tube is shrunk into a smaller opening end having a minimal inner diameter when the thermoplastic positioning portion deforms. The minimal inner diameter is smaller than the maximal outer diameter of the shaft tube assembly. A stator unit is coupled with an outer circumferential wall of the shaft tube, and the shaft tube is coupled with a rotor.

Still further, the invention discloses a motor assembling method. The motor assembling method provides a base with a shaft tube. The shaft tube has a thermoplastic positioning portion on an opening end thereof. A shaft tube assembly is disposed into the shaft tube via the opening end, and a stator unit is coupled with an outer circumferential wall of the shaft tube. The motor assembling method heats the thermoplastic positioning portion by a heating fixture to melt and deform the thermoplastic positioning portion until the opening end of the shaft tube has been deformed and expanded in a radial direction. The thermoplastic positioning portion forms a radial expansion protrusion after the thermoplastic positioning portion has cooled down and solidified, and the radial expansion protrusion holds the shaft tube assembly, or both the shaft tube assembly and the stator unit, in the shaft tube in position. The motor assembling method couples a rotor with the shaft tube.

Still further, the invention discloses a motor. The motor includes a base having a shaft tube receiving a shaft tube assembly and a stator unit. The shaft tube has an opening end having a thermoplastic positioning portion, and the thermoplastic positioning portion forms a radial expansion protrusion that holds the shaft tube assembly in the shaft tube in position. The shaft tube is coupled with a rotor.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
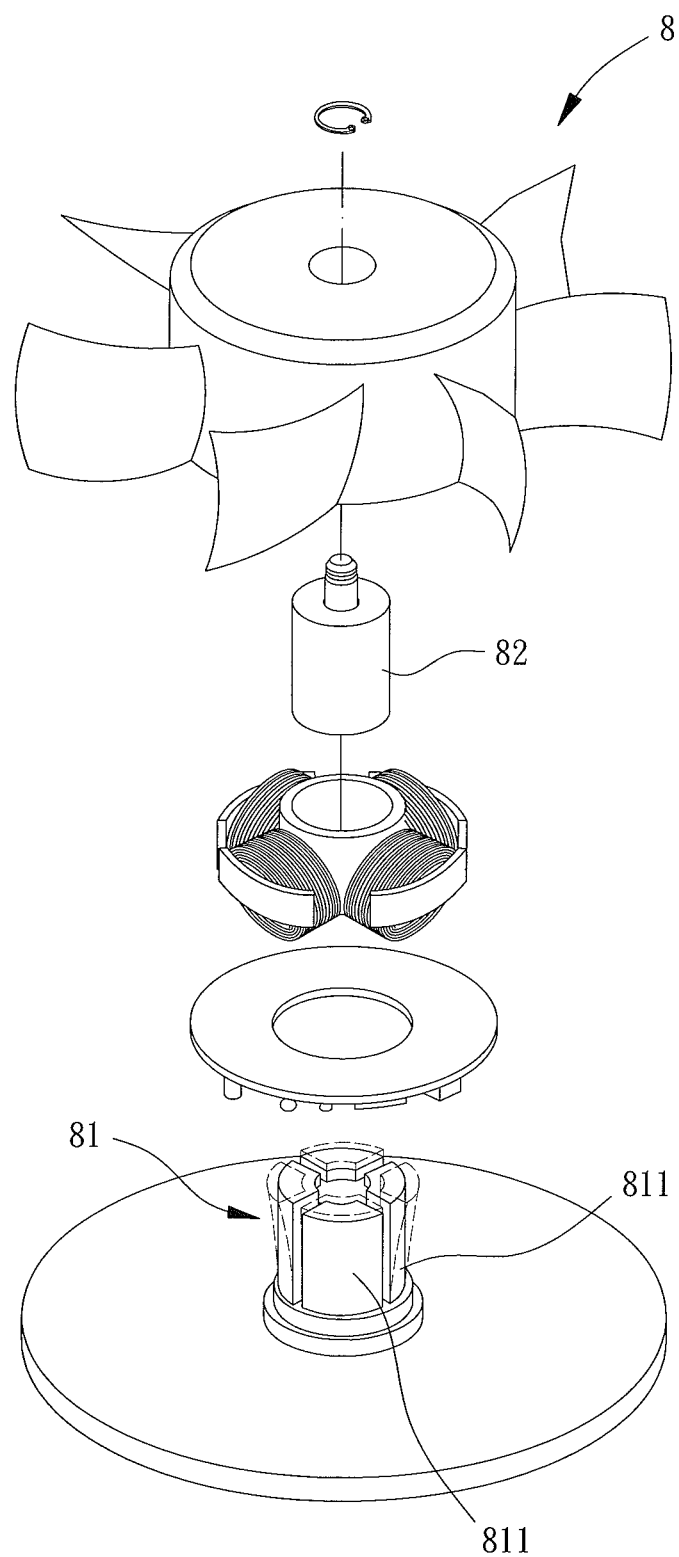
FIG. 1 shows an exploded diagram of a conventional cooling fan.
Figure 2:
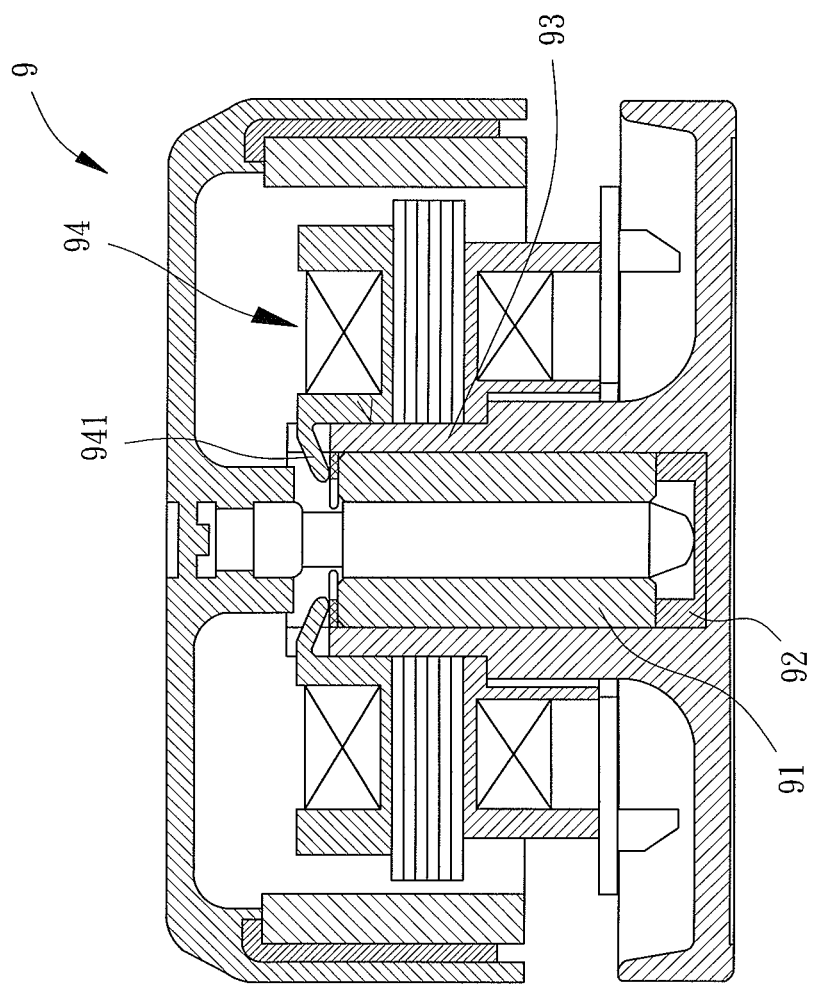
FIG. 2 shows a cross-sectional diagram of a conventional motor.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 3:
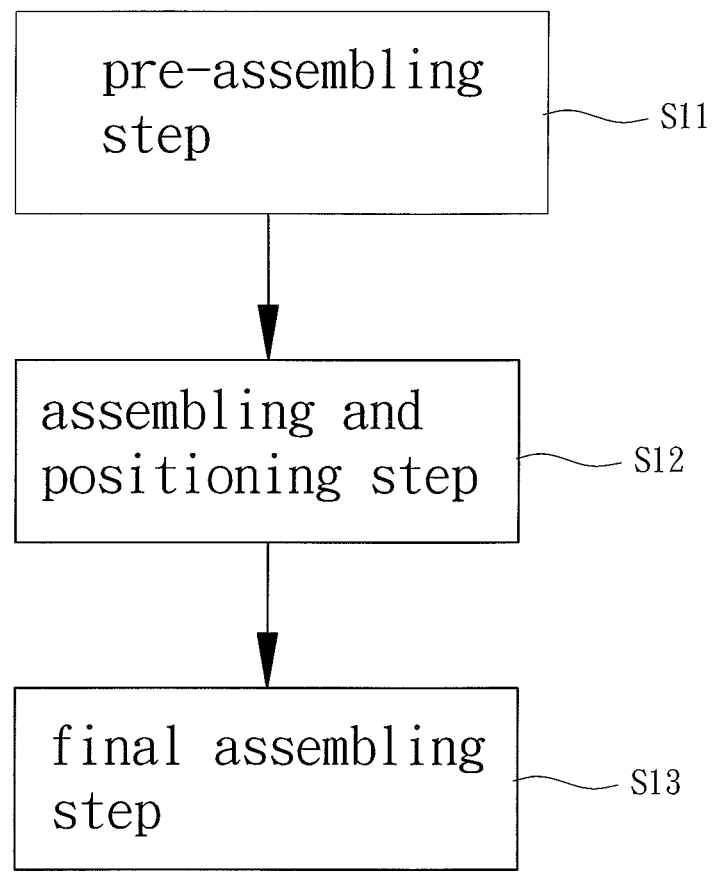
FIG. 3 shows a flowchart of a motor assembling method according to a first embodiment of the invention.

Referring to FIG. 3, a motor assembling method comprises a pre-assembling step S11, an assembling and positioning step S12 and a final assembling step S13 according to a first embodiment of the invention.

Figure 4:
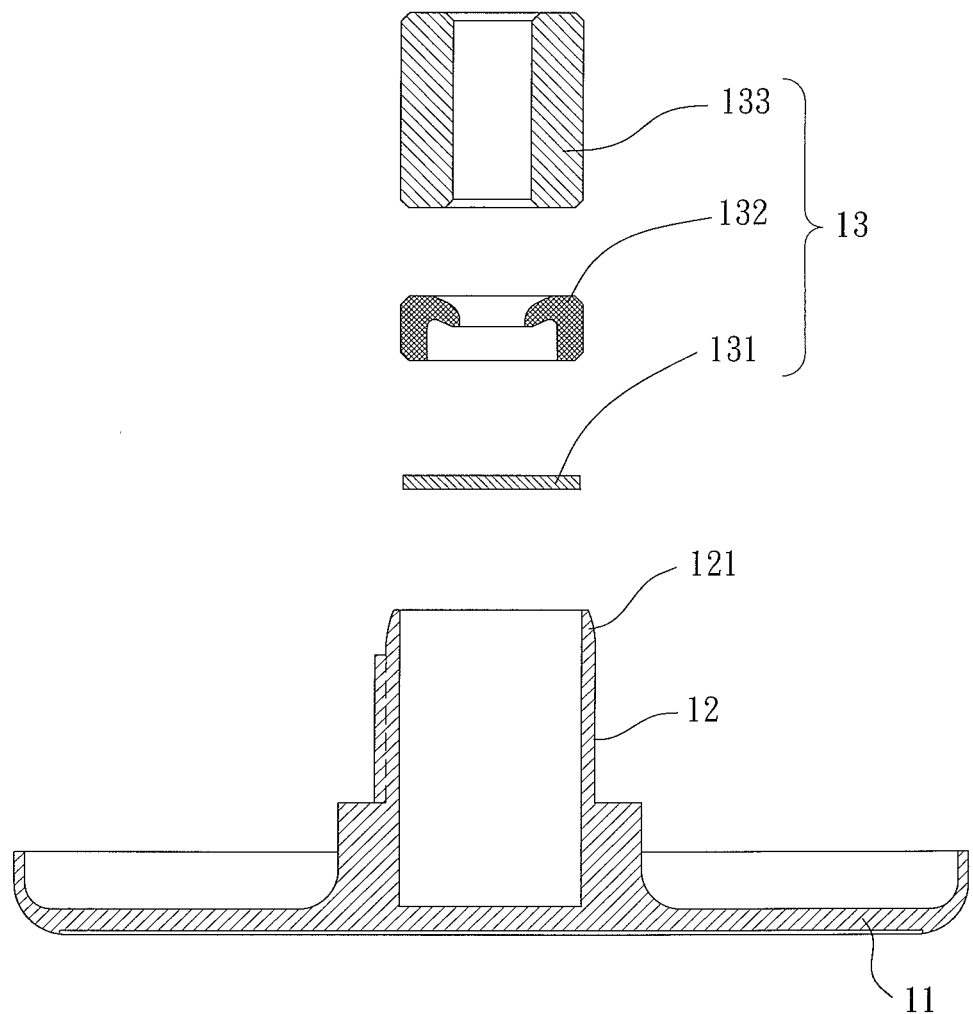
FIG. 4 shows a diagram of a pre-assembling step of the motor assembling method according to the first embodiment of the invention.
Figure 10:
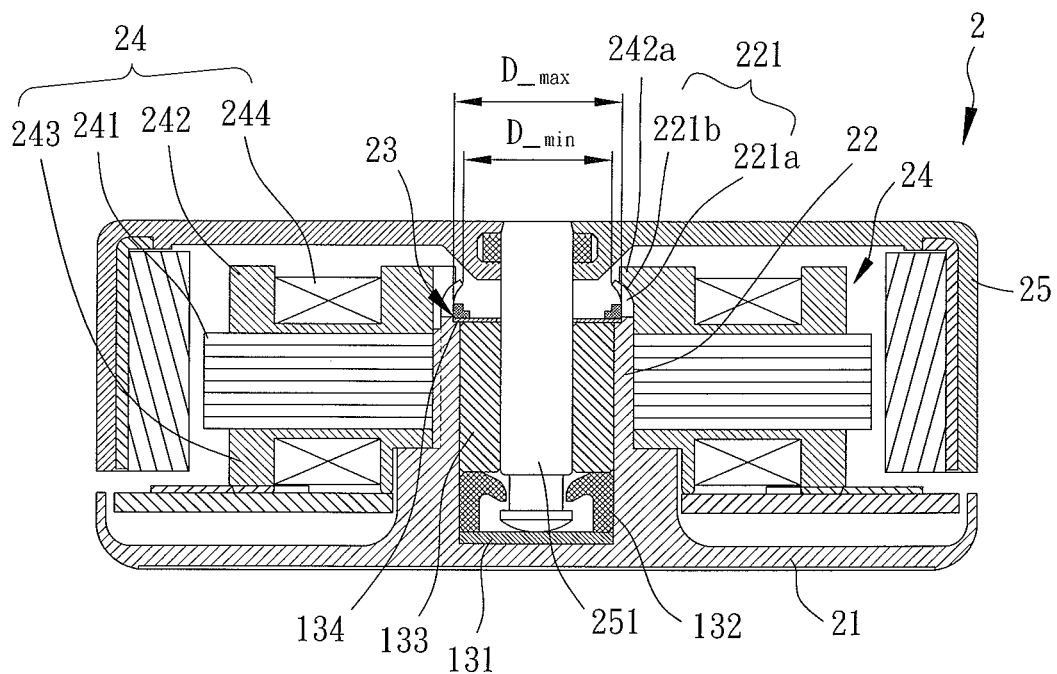
FIG. 10 shows a cross-sectional diagram of another motor of the first embodiment of the invention.

Referring to FIGS. 3 and 4, the pre-assembling step S11 provides a base 11 with a shaft tube 12, with the shaft tube 12 having a thermoplastic positioning portion 121 on an opening end thereof. Here, it is defined that components that are intended to be received in the shaft tube 12 are called "shaft tube assembly 13", which is used in the entire specification hereinafter. The shaft tube assembly 13 consists of at least one of the components that can be received in the shaft tube 12 and can provide various functions for a motor 1 (shown in FIG. 7), such as a wear-resisting plate 131, a holding member 132, a bearing 133, a dust-proof plate 134, an oil seal and a positioning member (the functions of these components are well-known in this art, so they are not described herein again), as shown in FIGS. 8 and 10. In this embodiment, the shaft tube 12 is made of thermoplastic material, and the shaft tube assembly 13 includes the wear-resisting plate 131, the holding member 132 and the bearing 133 disposed in the shaft tube 12 in order.

Figure 5:
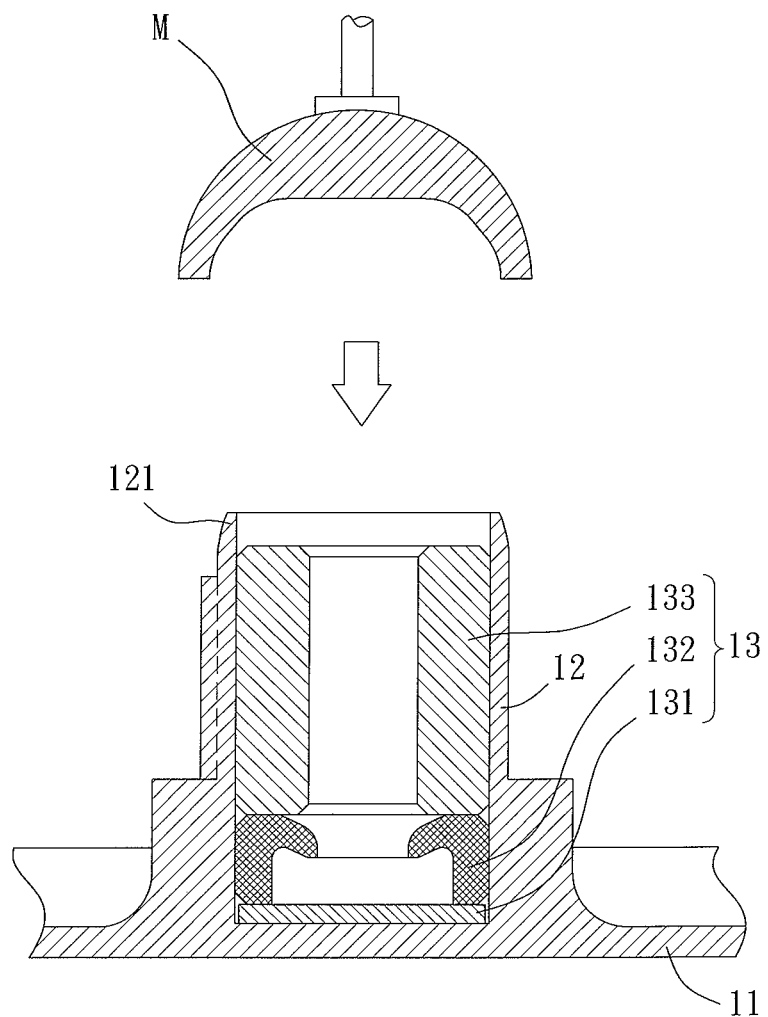
FIG. 5 shows a diagram of an assembling and positioning step of the motor assembling method according to the first embodiment of the invention.
Figure 6:
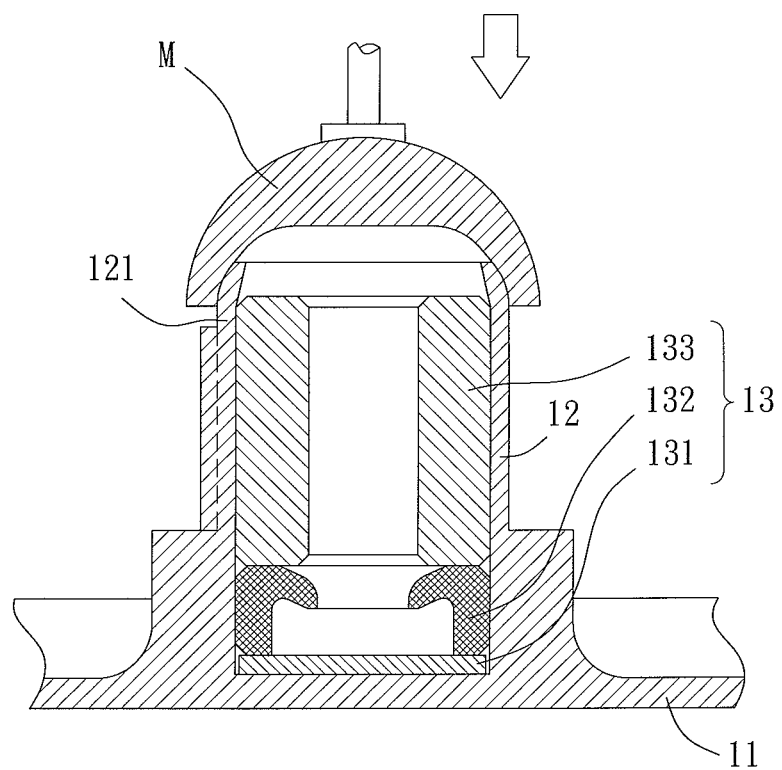
FIG. 6 shows another diagram of the assembling and positioning step of the motor assembling method according to the first embodiment of the invention.

As shown in FIGS. 3 and 5, the assembling and positioning step S12 provides a heating fixture M. The heating fixture M is used to press the thermoplastic positioning portion 121 so that the thermoplastic positioning portion 121 can be heated by heating the heating fixture M. As shown in FIG. 6, the thermoplastic positioning portion 121 becomes melted and deformed when being heated by the heating fixture M (one skilled in this art may readily appreciate that factors that determine melting of the thermoplastic positioning portion 121, such as heating temperature and time period, depend on the material condition of the thermoplastic positioning portion 121, so it is not described herein). Therefore, an inner diameter of an opening end of the shaft tube 12 can be reduced by heating the thermoplastic positioning portion 121. After the opening end of the shaft tube 12 has shrunk, the heating fixture M can be removed from the thermoplastic positioning portion 121. By the time the thermoplastic positioning portion 121 has cooled down and solidified, the shaft tube assembly 13 can be securely positioned in the shaft tube 12, thereby preventing the shaft tube assembly 13 from disengaging from the shaft tube 12.

Figure 7:
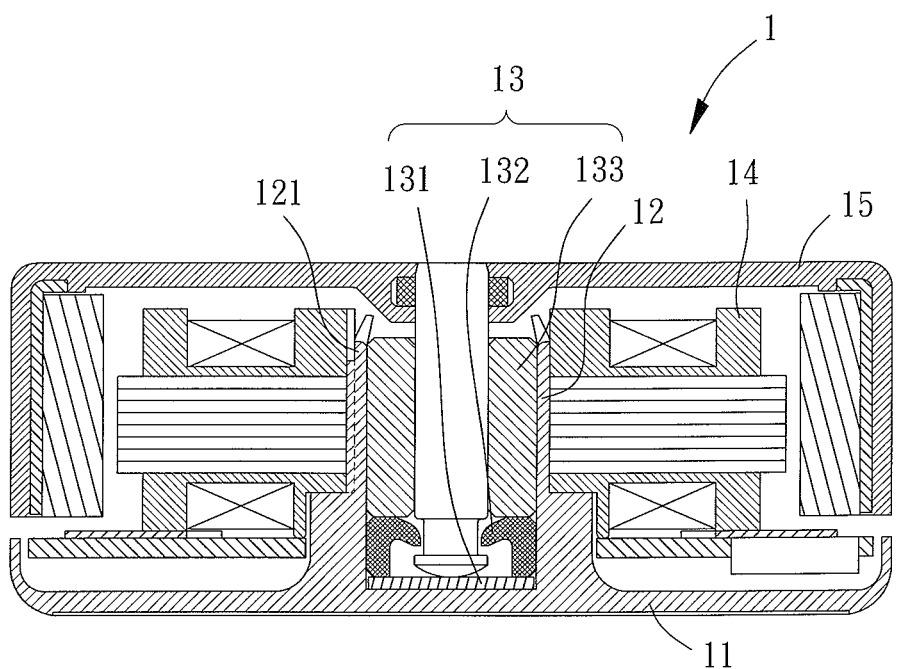
FIG. 7 shows a diagram of a final assembling step of the motor assembling method according to the first embodiment of the invention.
Figure 8:
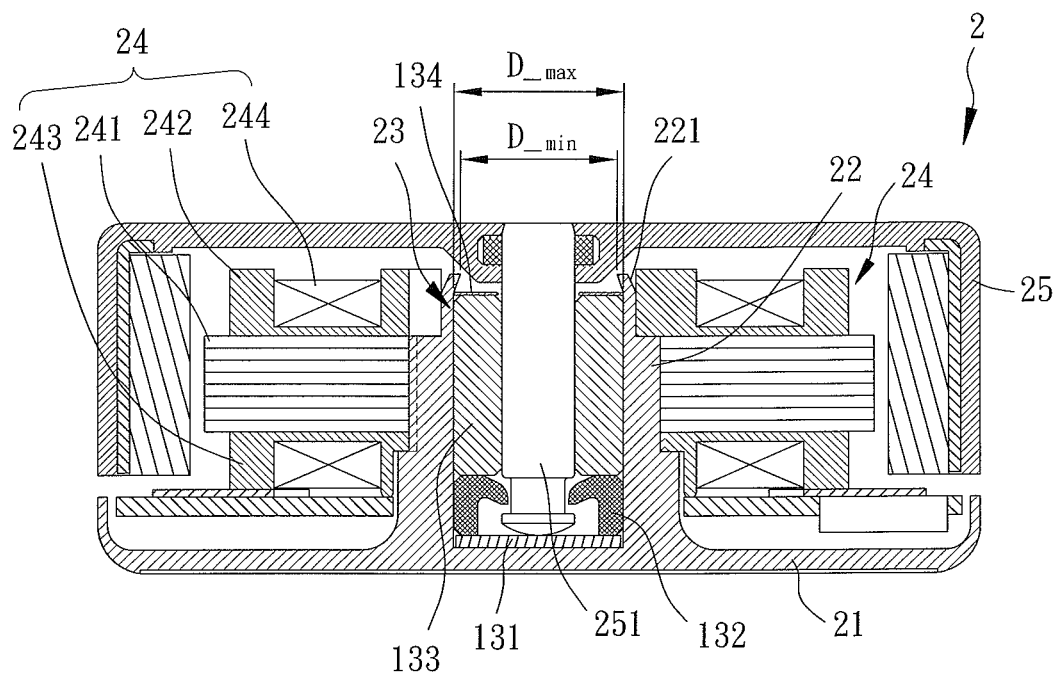
FIG. 8 shows a cross-sectional diagram of a motor of the first embodiment of the invention.

Referring to FIGS. 3 and 7, the final assembling step S13 is to couple a stator unit 14 with an outer circumferential wall of the shaft tube 12, and to rotatably couple a rotor 15 with the shaft tube 12. In this embodiment, the rotor 15 is rotatably coupled with the shaft tube assembly 13 disposed in the shaft tube 12. In this way, the rotor 15 can couple with the shaft tube 12 via the shaft tube assembly 13, thus completing the assembly procedure of the motor 1.

Based on the previous steps, the motor assembling method of the first embodiment of the invention can achieve at least following advantages described below.

First, since the thermoplastic positioning portion 121 is melted and deformed under the heating of the heating fixture M during the assembling and positioning step S12, the opening end of the shaft tube 12 will shrink after the thermoplastic positioning portion 121 has cooled down and solidified. Thus, as one advantage of the invention, the shrunk opening end of the shaft tube 12 may efficiently hold the shaft tube assembly 13 in the shaft tube 12 in position and may prevent the disengagement of the shaft tube assembly 13. This simplifies the assembly procedures of the motor 1.

Second, as another advantage of the invention, the motor assembling method of the first embodiment of the invention ensures that the shaft tube assembly 13 can be pressed and positioned in the shaft tube 12 in a proper way, preventing loosening or disengagement of the shaft tube assembly 13.

Third, the thermoplastic positioning portion 121 may serve the purpose of positioning the shaft tube assembly 13 during the assembling and positioning step S12 after the shaft tube 12 has cooled down and solidified. Thus, as another advantage of the invention, the motor assembling method of the first embodiment of the invention allows the shaft tube assembly 13 to be pressed simply by the thermoplastic positioning portion 121 without using additional components such as the stator unit 14. This prevents other components from being damaged during assembly procedures of the motor 1.

Referring to FIG. 8, based on the same concept of the motor assembling method of the first embodiment above, a motor 2 assembled using the motor assembling method of the first embodiment of the invention includes a base 21 having a shaft tube 22, with the shaft tube 22 receiving a shaft tube assembly 23 (similar to the shaft tube assembly 13). The shaft tube assembly 23 has a maximal outer diameter D_max. The shaft tube 22 has a thermoplastic positioning portion 221 on an opening end thereof which is away from the base 21. The thermoplastic positioning portion 221 forces the opening end of the shaft tube 22 to shrink into a smaller opening end having a minimal inner diameter D_min. The minimal inner diameter D_min is designed to be smaller than the maximal outer diameter $D_{13}$ max in order to keep the shaft tube assembly 23 in the shaft tube 22. The thermoplastic positioning portion 221 can be of any structure that melts and is deformed under a heating operation. The minimal inner diameter D_min is the size of the shrunk opening end of the shaft tube 22 after the thermoplastic positioning portion 221 has cooled down and solidified from the heating operation.

Figure 9:
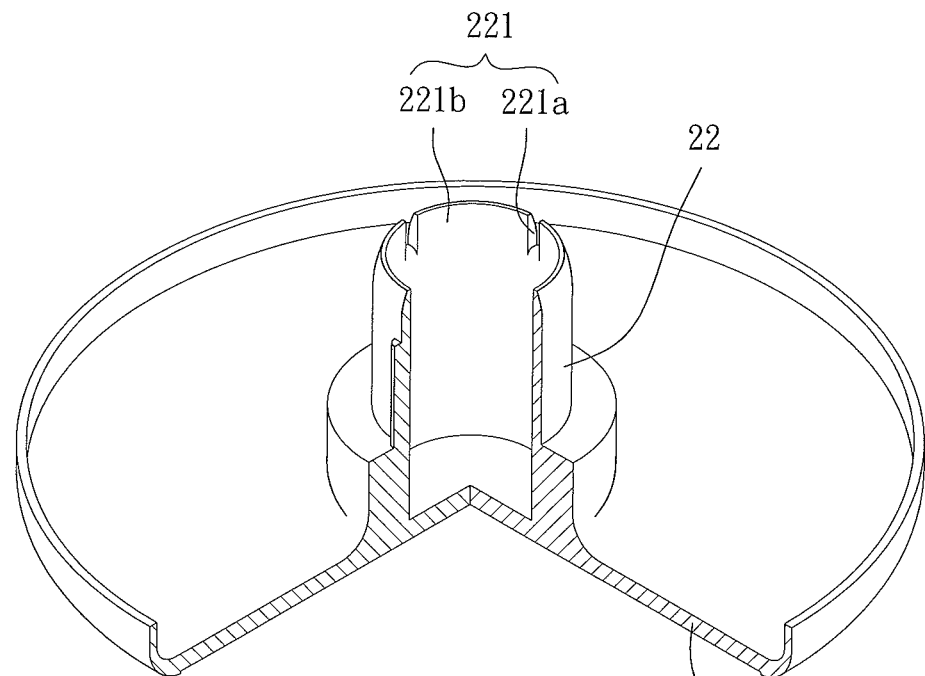
FIG. 9 shows a diagram of a motor base of the first embodiment of the invention.

In the embodiment, as shown in FIG. 9, the thermoplastic positioning portion 221 is shown to include a plurality of grooves 221a extending from an outer circumferential wall to an inner circumferential wall of the shaft tube 22, with a position-fixing plate 221b formed between two adjacent grooves 221a. Based on the grooves 221a, when the heating fixture M presses the thermoplastic positioning portion 221, the position-fixing plates 221b can be bent inwards more easily, thus forming the shrunk opening end of the shaft tube 22.

A stator unit 24 may be further coupled with the outer circumferential wall of the shaft tube 22, with the shaft tube 22 coupled with a rotor 25. The stator unit 24 can be of any structure capable of driving the rotor 25 to rotate. The rotor 25 has a shaft 251 rotatably coupled with the shaft tube assembly 23, allowing the rotor 25 to couple with the shaft tube 22 via the shaft 251 and the shaft tube assembly 23.

Furthermore, referring to FIG. 10, the stator unit 24 may consist of a plurality of silicon steel plates 241, an upper insulation sleeve 242, a lower insulation sleeve 243 and a coil 244. The silicon steel plates 241, the upper insulation sleeve 242 and the lower insulation sleeve 243 are stacked to form an insulated silicon steel plate entity, with an enameled wire wound around a predetermined portion of the insulated silicon steel plate entity to form the coil 244. In this arrangement, the upper insulation sleeve 242 may form a pressing portion 242a pressing the thermoplastic positioning portion 221. In this way, the upper insulation sleeve 242 and the thermoplastic positioning portion 221 can jointly provide an enhanced positioning effect for the shaft tube assembly 23.

Based on the above description, the motor 2 of the first embodiment of the invention can achieve at least the following advantage below. For example, since the opening end of the shaft tube 22 can shrink and the minimal inner diameter D_min is designed to be smaller than the maximal outer diameter D_max, the invention can keep the shaft tube assembly 23 in the shaft tube 22 and can prevent the shaft tube assembly 23 from disengaging from the shaft tube 22. Therefore, the invention achieves the cost reduction and reduces overall structural complexity of the motor 2.

Figure 11:
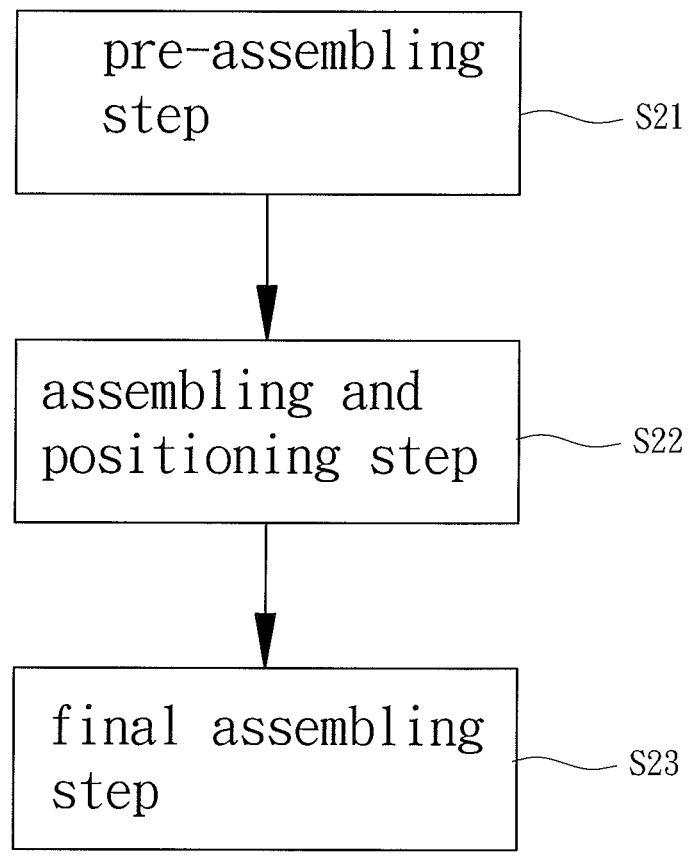
FIG. 11 shows a flowchart of a motor assembling method according to a second embodiment of the invention.

Referring to FIG. 11, a motor assembling method comprises a pre-assembling step S21, an assembling and positioning step S22 and a final assembling step S23 according to a second embodiment of the invention.

Figure 12:
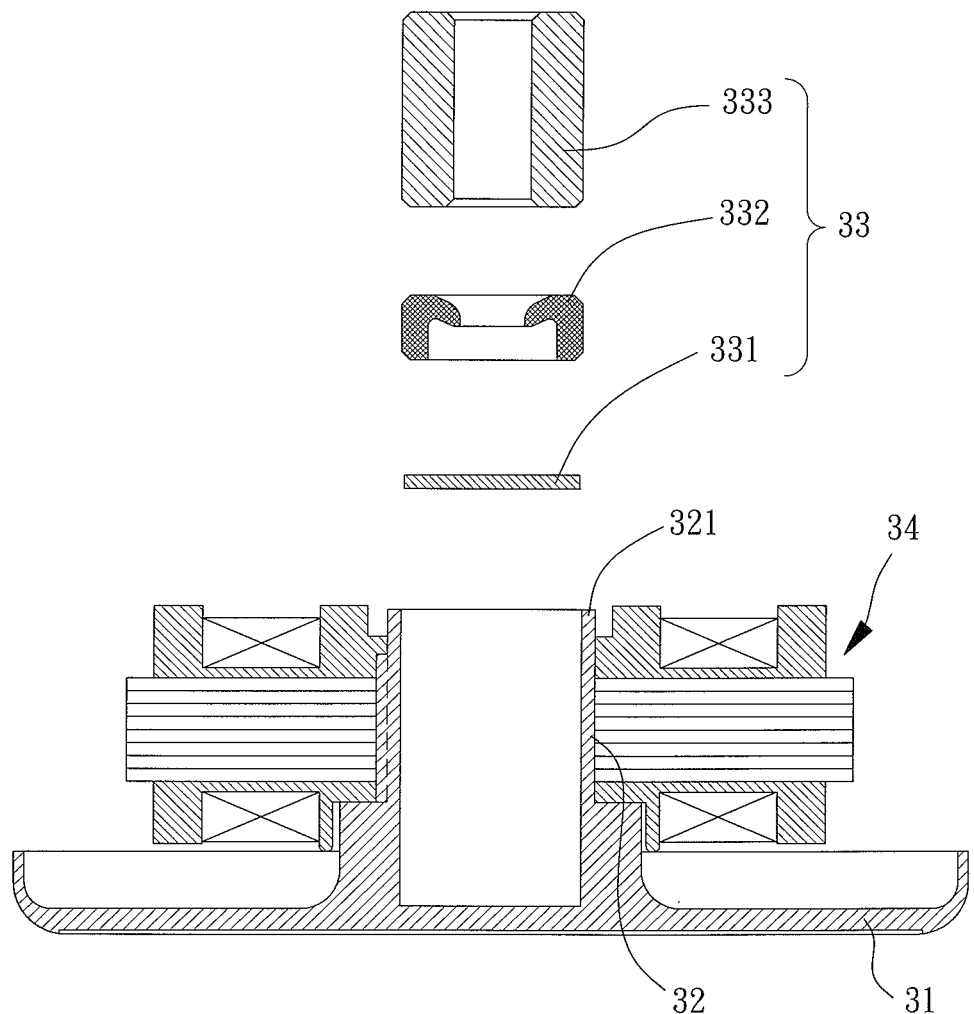
FIG. 12 shows a diagram of a pre-assembling step of the motor assembling method according to the second embodiment of the invention.

Referring to FIGS. 11 and 12, the pre-assembling step S21 is to provide a base 31 with a shaft tube 32, with the shaft tube 32 having a thermoplastic positioning portion 321 on an opening end thereof. Then, a shaft tube assembly 33 (that is similar to the shaft tube assembly 13 intended to be received in a shaft tube) is disposed in the shaft tube 32, and a stator unit 34 is coupled with an outer circumferential wall of the shaft tube 32. In the embodiment, the shaft tube 32 is made of thermoplastic material, and the shaft tube assembly 33 includes a wear-resisting plate 331, a holding member 332 and a bearing 333 which are disposed in the shaft tube 32 in order.

Figure 13:
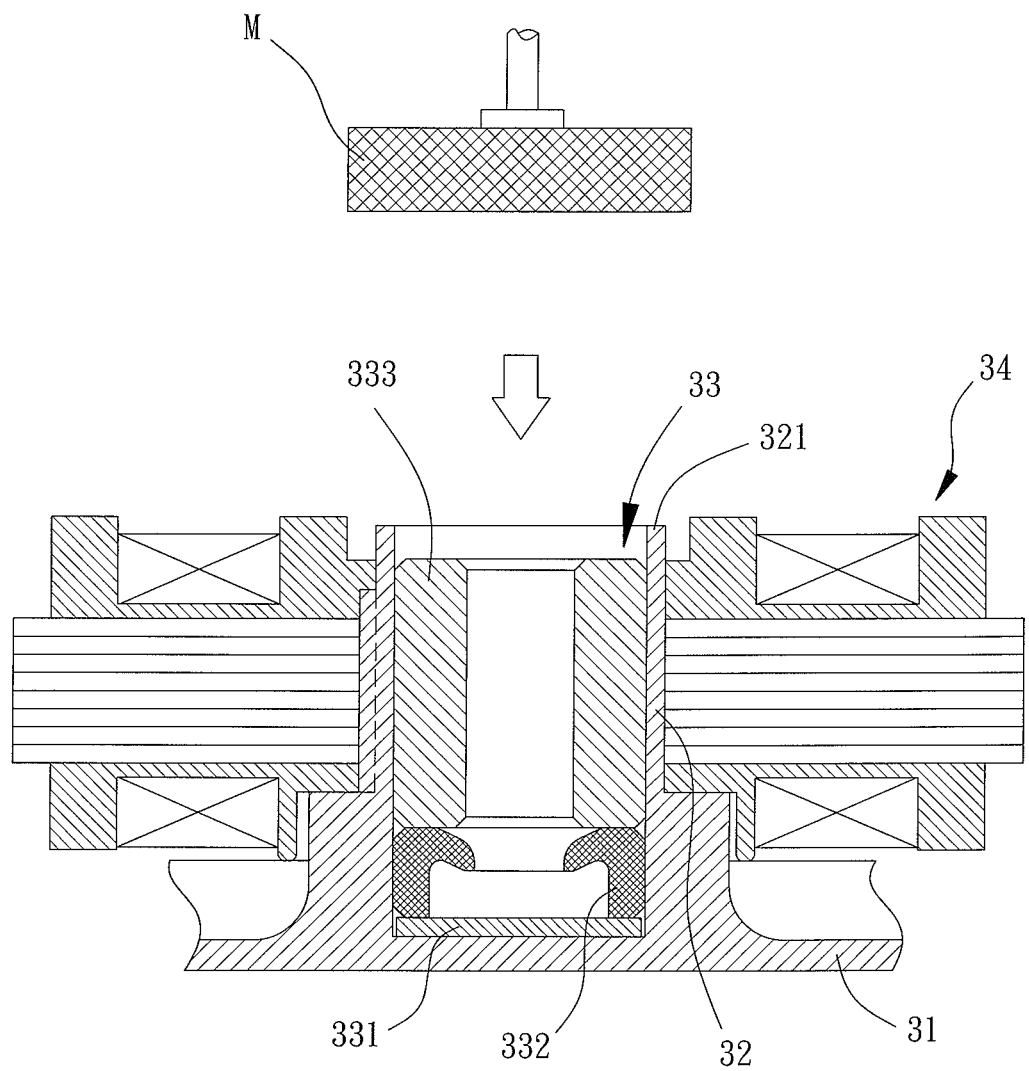
FIG. 13 shows a diagram of an assembling and positioning step of the motor assembling method according to the second embodiment of the invention.
Figure 14:
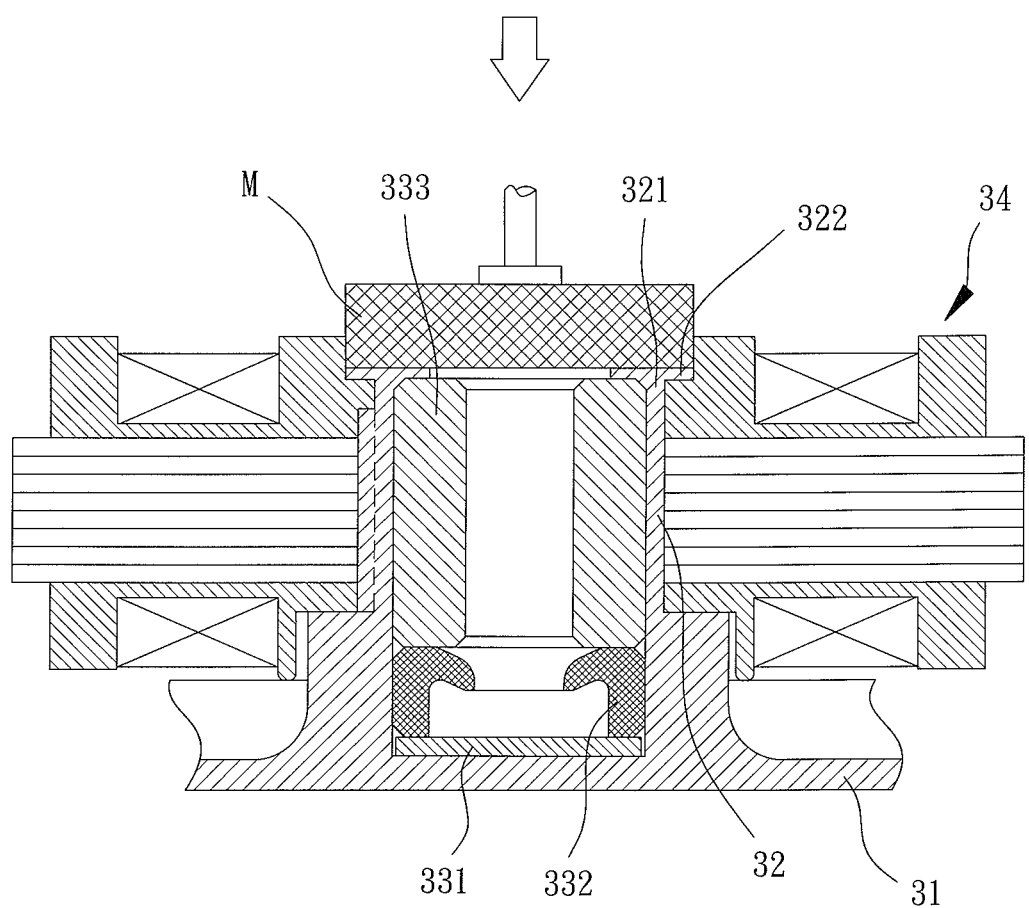
FIG. 14 shows another diagram of the assembling and positioning step of the motor assembling method according to the second embodiment of the invention.

As shown in FIGS. 11 and 13, the assembling and positioning step S22 is to provide a heating fixture M. The heating fixture M is used to press the thermoplastic positioning portion 321 of the shaft tube 32 so that the thermoplastic positioning portion 321 can be heated by heating the heating fixture M. As shown in FIG. 14, the thermoplastic positioning portion 321 melts and deforms when heated by the heating fixture M, forcing the opening end of the shaft tube 32 to deform and expand in a radial direction. After the opening end of the shaft tube 32 has deformed and is expanded, the heating fixture M can be removed from the thermoplastic positioning portion 321. By the time the thermoplastic positioning portion 321 has cooled down and solidified, the thermoplastic positioning portion 321 will form a radial expansion protrusion 322 that firmly holds the shaft tube assembly 33 and the stator unit 34 in the shaft tube 32 in position (note the radial expansion protrusion 322 can hold only the shaft tube assembly 33 in the shaft tube 32 rather than both the shaft tube assembly 33 and the stator unit 34). As such, the shaft tube assembly 33 and the stator unit 34 can be securely positioned in the shaft tube 32, thereby preventing the shaft tube assembly 33 and the stator unit 34 from disengaging from the shaft tube 32.

Figure 15:
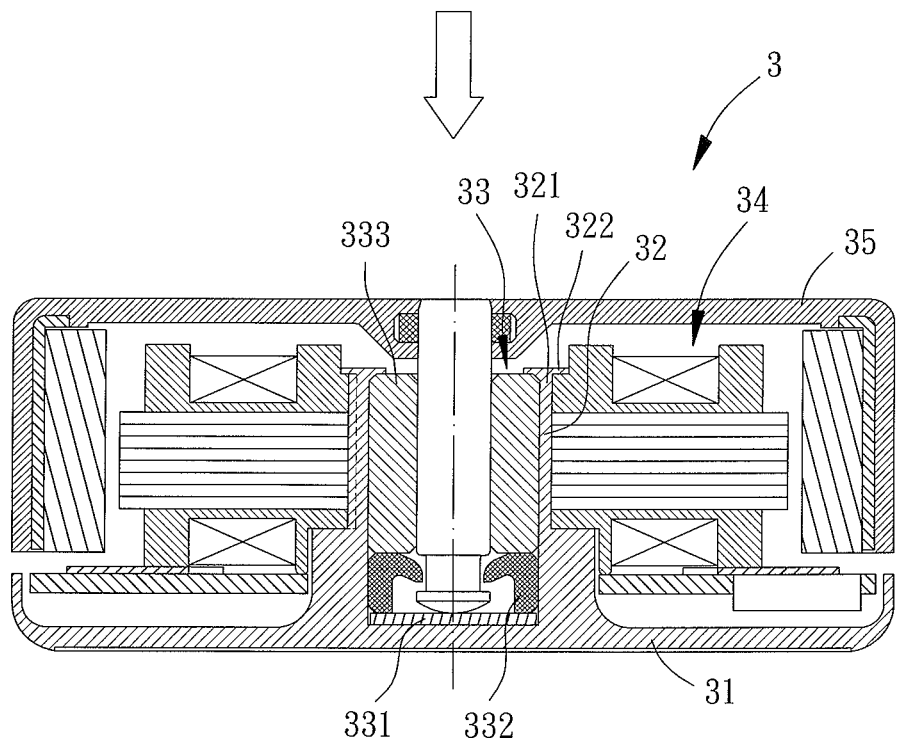
FIG. 15 shows a diagram of a final assembling step of the motor assembling method according to the second embodiment of the invention.

Referring to FIGS. 11 and 15, the final assembling step S23 is to rotatably couple a rotor 35 with the shaft tube 32. In this embodiment, the rotor 35 is rotatably coupled with the shaft tube assembly 33 disposed in the shaft tube 32. In this way, the rotor 35 can couple with the shaft tube 32 via the shaft tube assembly 33, thus completing the assembly procedure of a motor 3.

Figure 16:
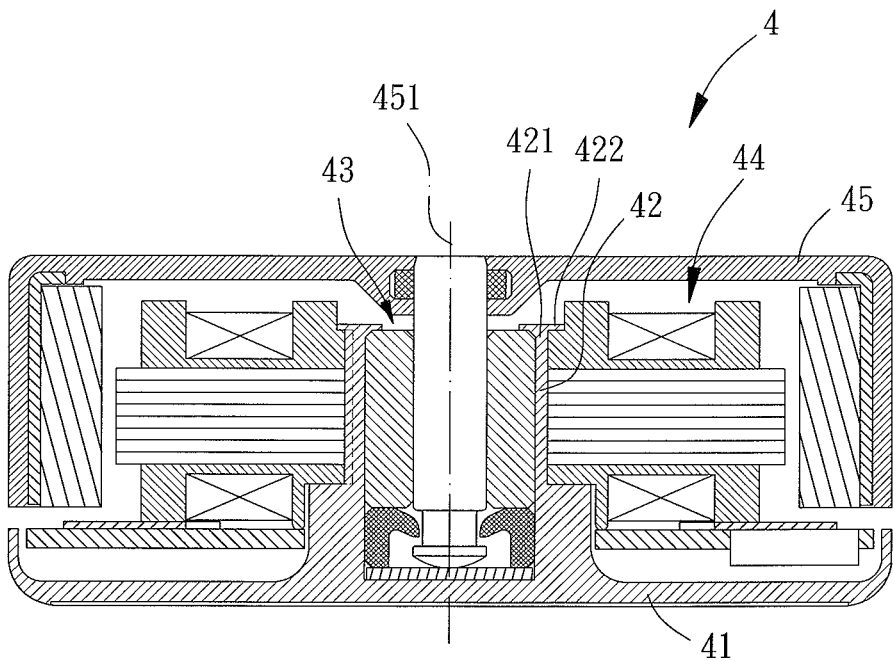
FIG. 16 shows a cross-sectional diagram of a motor of the second embodiment of the invention.

Referring to FIG. 16, based on the same concept of the motor assembling method of the second embodiment above, a motor 4 assembled using the motor assembling method of the second embodiment of the invention includes a base 41 having a shaft tube 42, with the shaft tube 42 receiving a shaft tube assembly 43 and having an outer circumferential wall coupled with a stator unit 44. Further, the shaft tube 42 has an opening end away from the base 41 and having a thermoplastic positioning portion 421. The thermoplastic positioning portion 421 forces the opening end of the shaft tube 42 to deform as a radial expansion protrusion 422 that holds the shaft tube assembly 43 and the stator unit 44 in the shaft tube 42 in position (note the radial expansion protrusion 422 can also hold only the shaft tube assembly 43 in the shaft tube 42 in position). As such, the shaft tube assembly 43 and the stator unit 44 can be securely positioned in the shaft tube 42, thereby preventing the shaft tube assembly 43 and the stator unit 44 from disengaging from the shaft tube 42. Moreover, the shaft tube 42 is coupled to a rotor 45 having a shaft 451 rotatably coupled with the shaft tube assembly 43, allowing the rotor 45 to couple with the shaft tube 42 via the shaft tube assembly 43 and the shaft 451.

As stated above, the motor assembling method of the second embodiment of the invention can also provide many advantages offered by the motor assembling method of the first embodiment, such as those advantages of simplifying the assembly procedures, preventing loosening and disengagement of the shaft tube assembly 23, 43 and preventing damages of other components caused during assembly procedures. More importantly, the invention can use the heating fixture M to heat the shaft tube 32, 42 to cause the radial deformation and expansion of the opening end of the shaft tube 32, 42, thus forming the radial expansion protrusion 322, 422 that serves the purpose of positioning the shaft tube assembly 33, 43 and the stator unit 34, 44. Thus, convenient assembly of the motor 3, 4 is attained.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor assembling method, comprising:
providing a base with a shaft tube extending from the base to an opening end in an axial direction, with the shaft tube having an inner circumferential wall of a constant diameter from the opening end towards the base and an outer circumferential wall, wherein the shaft tube has a thermoplastic positioning portion on the opening end thereof;
disposing a shaft tube assembly into the inner circumferential wall of the constant diameter of the shaft tube via the opening end, with the shaft tube assembly having a maximum outer diameter equal to the inner circumferential wall of the constant diameter for slideable receipt therein, with the opening end of the shaft tube extending beyond a top face of the shaft tube assembly in the axial direction;
heating the thermoplastic positioning portion by a heating fixture to melt and deform the thermoplastic positioning portion until the opening end of the shaft tube has shrunk to have a reduced diameter smaller than the constant diameter, wherein the shaft tube assembly is held in position in the shaft tube by the reduced diameter after the thermoplastic positioning portion has cooled down and solidified, with an end portion of the outer circumferential wall of the shaft tube at the opening end and beyond the shaft tube assembly having increasing size from the opening end towards the base;
coupling an interior passage of a stator unit with the outer circumferential wall of the shaft tube and pressing a pressing potion of the stator unit with the end portion of the shaft tube, with the pressing portion having an increasing size corresponding to the increasing size of the end portion of the outer circumferential wall of the shaft tube; and
coupling a rotor with the shaft tube.

2. The motor assembling method as claimed in claim 1, wherein the heating fixture presses the thermoplastic positioning portion and then heats the thermoplastic positioning portion.

3. The motor assembling method as claimed in claim 1, wherein the shaft tube is made of thermoplastic material.

4. The motor assembling method as claimed in claim 1, wherein disposing the shaft tube assembly into the shaft tube includes inserting a wear-resisting plate, a holding member and a bearing of the shaft tube assembly into the shaft tube in order.

5. The motor assembling method as claimed in claim 1, wherein coupling the rotor with the shaft tube includes rotatably coupling the rotor with the shaft tube assembly disposed in the shaft tube.

6. A motor including a base having a shaft tube receiving a shaft tube assembly, wherein the shaft tube extends from the base to an opening end in an axial direction, with the shaft tube having an inner circumferential wall of a constant diameter from the opening end towards the base and an outer circumferential wall, wherein the shaft tube assembly has a maximal outer diameter generally equal to and for slideable receipt in the inner circumferential wall of the constant diameter, with an end portion of the outer circumferential wall of the shaft tube at the opening end extending beyond a top face of the shaft tube assembly in the axial direction, wherein the shaft tube has a thermoplastic positioning portion on the opening end thereof, wherein the opening end of the shaft tube has shrunk into a smaller opening end having a minimal inner diameter when the thermoplastic positioning portion deforms, wherein the minimal inner diameter is smaller than the maximal outer diameter of the shaft tube assembly to hold the shaft tube assembly in position in the shaft tube, with the outer circumferential wall of the end portion of the shaft tube having increasing size from the opening end towards the base, wherein a stator unit has an interior passage coupled with the outer circumferential wall of the shaft tube, with the interior passage of the stator unit having a pressing portion having an increasing size corresponding to the increasing size of the end portion of the outer circumferential wall of the shaft tube, with the pressing portion pressing against the outer circumferential wall of the end portion of the shaft tube, and wherein the shaft tube is coupled with a rotor.

7. The motor as claimed in claim 6, wherein the thermoplastic positioning portion is formed on an opening end of the shaft tube.

8. The motor as claimed in claim 6, wherein the thermoplastic positioning portion is in a form of a plurality of grooves extending from an outer circumferential wall to the inner circumferential wall of the shaft tube, and wherein a position-fixing plate is formed between adjacent two of the plurality of grooves.

9. The motor as claimed in claim 6, wherein the stator unit includes a plurality of silicon steel plates, an upper insulation sleeve, a lower insulation sleeve and a coil, wherein the plurality of silicon steel plates, the upper insulation sleeve and the lower insulation sleeve are stacked to form an insulated silicon steel plate entity, wherein an enameled wire is wound around a predetermined portion of the insulated silicon steel plate entity to form the coil, and wherein the pressing portion is located on the upper insulation sleeve.

10. The motor as claimed in claim 6, wherein the shaft tube assembly includes at least one of a bearing, a holding member, a dust-proof plate and a wear-resisting plate.

11. A motor assembling method comprising:
providing a base with a shaft tube extending from the base to an opening end in an axial direction, wherein the shaft tube has an inner circumferential wall of a constant diameter from the opening end towards the base, and wherein the shaft tube has a thermoplastic positioning portion on the opening end thereof;
disposing a shaft tube assembly into the inner circumferential wall of the constant diameter of the shaft tube via the opening end, wherein the shaft tube assembly has a maximum outer diameter equal to the inner circumferential wall of the constant diameter for slideable receipt therein, with the opening end of the shaft tube extending beyond a top face of the shaft tube assembly in the axial direction;

coupling a stator unit with an outer circumferential wall of the shaft tube;

heating the thermoplastic positioning portion by a heating fixture to melt and deform the thermoplastic positioning portion until the opening end of the shaft tube has been deformed and expanded in a radial direction, wherein the thermoplastic positioning portion forms a radial expansion protrusion extending generally perpendicularly to the axial direction after the thermoplastic positioning portion has cooled down and solidified, and wherein the radial expansion protrusion has a reduced diameter smaller than the constant diameter and holds the shaft tube assembly in the shaft tube in position by the reduced diameter and has an outer diameter greater than the constant diameter and abutting with the stator unit to hold the stator unit on the shaft tube in position; and coupling a rotor with the shaft tube.

12. The motor assembling method as claimed in claim 11, wherein the heating fixture presses the thermoplastic positioning portion and then heats the thermoplastic positioning portion.

13. The motor assembling method as claimed in claim 11, wherein the shaft tube is made of thermoplastic material.

14. The motor assembling method as claimed in claim 11, wherein disposing the shaft tube assembly into the shaft tube includes inserting a wear-resisting plate, a holding member and a bearing of the shaft tube assembly into the shaft tube in order.

15. The motor assembling method as claimed in claim 11, wherein coupling the rotor with the shaft tube includes rotatably coupling the rotor with the shaft tube assembly disposed in the shaft tube.

16. A motor including a base having a shaft tube that receives a shaft tube assembly and couples with a stator unit, wherein the shaft tube extends from the base to an opening end in an axial direction, wherein the shaft tube has an inner circumferential wall of a constant diameter from the opening end towards the base, with the opening end of the shaft tube extending beyond a top face of the shaft tube assembly in the axial direction, wherein the opening end has a thermoplastic positioning portion, wherein the thermoplastic positioning portion forms a radial expansion protrusion extending perpendicular to the axial direction, with the radial expansion protrusion extending from the inner circumferential wall of the shaft tube towards a central axis of the shaft tube, wherein the radial expansion protrusion forms an opening having a diameter smaller than an outer diameter of the shaft tube assembly, wherein the radial expansion protrusion holds the shaft tube assembly in the shaft tube in position, wherein the shaft tube is coupled with a rotor, and wherein the radial expansion protrusion extends from the inner circumferential wall of the shaft tube away from the central axis and further holds the stator unit on the shaft tube in position.

17. The motor as claimed in claim 16, wherein the stator unit includes a plurality of silicon steel plates, an upper insulation sleeve, a lower insulation sleeve and a coil, wherein the plurality of silicon steel plates, the upper insulation sleeve and the lower insulation sleeve are stacked to form an insulated silicon steel plate entity, and wherein an enameled wire is wound around a predetermined portion of the insulated silicon steel plate entity to form the coil.

18. The motor as claimed in claim 16, wherein the shaft tube assembly includes at least one of a bearing, a holding member, a dust-proof plate, an oil seal, a positioning member and a wear-resisting plate.

19. A motor assembling method comprising:

providing a base with a shaft tube extending from the base to an opening end in an axial direction, wherein the shaft tube has an inner circumferential wall of a constant diameter from the opening end towards the base, and wherein the shaft tube has a thermoplastic positioning portion on the opening end thereof;

disposing a shaft tube assembly into the inner circumferential wall of the constant diameter of the shaft tube via the opening end, wherein the shaft tube assembly has a maximum outer diameter equal to the inner circumferential wall of the constant diameter for slideable receipt therein, with the opening end of the shaft tube extending beyond a top face of the shaft tube assembly in the axial direction;

coupling a stator unit with an outer circumferential wall of the shaft tube;

heating the thermoplastic positioning portion by a heating fixture to melt and deform the thermoplastic positioning portion until the opening end of the shaft tube has been deformed and expanded in a radial direction, wherein the thermoplastic positioning portion forms a radial expansion protrusion extending perpendicular to the axial direction after the thermoplastic positioning portion has cooled down and solidified, and wherein the radial expansion protrusion has a reduced diameter smaller than the constant diameter and holds the shaft tube assembly in the shaft tube in position by the reduced diameter while holding the stator unit in position at the same time and has an outer diameter greater than the constant diameter and abutting with the stator unit to hold the stator unit on the shaft tube in position; and coupling a rotor with the shaft tube.

20. The motor assembling method as claimed in claim 19, wherein the heating fixture presses the thermoplastic positioning portion and then heats the thermoplastic positioning portion.

21. The motor assembling method as claimed in claim 19, wherein the shaft tube is made of thermoplastic material.

22. The motor assembling method as claimed in claim 19, wherein disposing the shaft tube assembly into the shaft tube includes inserting a wear-resisting plate, a holding member and a bearing of the shaft tube assembly into the shaft tube in order.

23. The motor assembling method as claimed in claim 19, wherein coupling the rotor with the shaft tube includes rotatably coupling the rotor with the shaft tube assembly disposed in the shaft tube.

* * * * *